(12) United States Patent
White

(10) Patent No.: US 9,933,029 B2
(45) Date of Patent: Apr. 3, 2018

(54) REDUCED-DIAMETER BRAKE ROTOR FOR HEAVY-DUTY VEHICLES

(71) Applicant: HENDRICKSON U.S.A., L.L.C., Itasca, IL (US)

(72) Inventor: Jay D. White, Massillon, OH (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 0 days.

(21) Appl. No.: 14/744,143

(22) Filed: Jun. 19, 2015

(65) Prior Publication Data
US 2015/0369313 A1 Dec. 24, 2015

Related U.S. Application Data

(60) Provisional application No. 62/014,871, filed on Jun. 20, 2014.

(51) Int. Cl.
*F16D 65/12* (2006.01)

(52) U.S. Cl.
CPC .... *F16D 65/123* (2013.01); *F16D 2200/0013* (2013.01)

(58) Field of Classification Search
CPC ....... F16D 65/12; F16D 65/123; F16D 65/125
USPC .................................................. 188/218 XL
See application file for complete search history.

(56) References Cited

U.S. PATENT DOCUMENTS

| 3,318,423 | A | * | 5/1967 | Dunki | ..... C22C 37/00 188/251 M |
| 3,378,114 | A | * | 4/1968 | Hollins | ..... F16D 65/12 188/218 XL |
| 3,393,775 | A | * | 7/1968 | Hollins | ..... F16D 65/12 188/218 XL |
| 4,651,851 | A | | 3/1987 | Latvala et al. | |
| 4,844,206 | A | * | 7/1989 | Casey | ..... F16D 55/40 188/18 A |
| 5,305,636 | A | * | 4/1994 | Balsarotti | ..... G01L 5/28 73/121 |
| 6,161,661 | A | | 12/2000 | Pahle et al. | |
| 6,374,956 | B1 | | 4/2002 | Naeumann et al. | |

(Continued)

FOREIGN PATENT DOCUMENTS

| CN | 101942599 A | 1/2011 |
| JP | S5663135 A | 5/1981 |

*Primary Examiner* — Bradley T King
*Assistant Examiner* — James K Hsiao
(74) *Attorney, Agent, or Firm* — Dureska & Moore, LLC; David P. Dureska; David J. Danko

(57) ABSTRACT

The invention is directed to a reduced-diameter brake rotor for heavy-duty vehicles. The rotor has a reduced diameter to enable it to be used in conjunction with reduced-diameter wheel end configurations. The rotor includes a radially-extending disc that in turn includes an inboard surface and an outboard surface, and a solid, constant cross-section between the inboard and outboard surfaces. The rotor also includes a radially-extending mounting flange for mounting the rotor to a wheel hub of the vehicle. An axially-extending sleeve is integrally formed with and extends between the disc and the mounting flange. The solid disc and other features of the rotor desirably reduce the peak temperature of the rotor by increasing its mass, reduce coning of the rotor during braking, and desirably maintain the heat transfer properties of the rotor while decreasing the brittleness and improving the hot strength of the rotor.

15 Claims, 7 Drawing Sheets

(56) References Cited

U.S. PATENT DOCUMENTS

| | | | |
|---|---|---|---|
| 6,564,912 B1 | 5/2003 | Koschinat | |
| 7,281,769 B2 * | 10/2007 | Pete | B60B 27/00 188/18 A |
| 7,677,368 B2 * | 3/2010 | Tedesco | F16D 65/128 188/18 A |
| 7,780,243 B2 * | 8/2010 | Lippis | F16D 65/12 188/18 A |
| 7,934,777 B1 * | 5/2011 | Yuhas | B60B 3/16 188/18 A |
| 8,950,556 B2 * | 2/2015 | Root | B60B 27/0052 188/18 A |
| 2002/0138189 A1 | 9/2002 | Kubik | |
| 2009/0218183 A1 * | 9/2009 | Burgoon | B60T 8/329 188/218 XL |
| 2011/0108378 A1 | 5/2011 | Leone et al. | |
| 2011/0226570 A1 * | 9/2011 | Ludwig | F16D 65/12 188/218 XL |
| 2013/0327602 A1 * | 12/2013 | Barber | B22C 9/02 188/218 XL |
| 2014/0151167 A1 * | 6/2014 | Ronchi | F16D 65/0006 188/218 XL |
| 2015/0021128 A1 | 1/2015 | White et al. | |

* cited by examiner

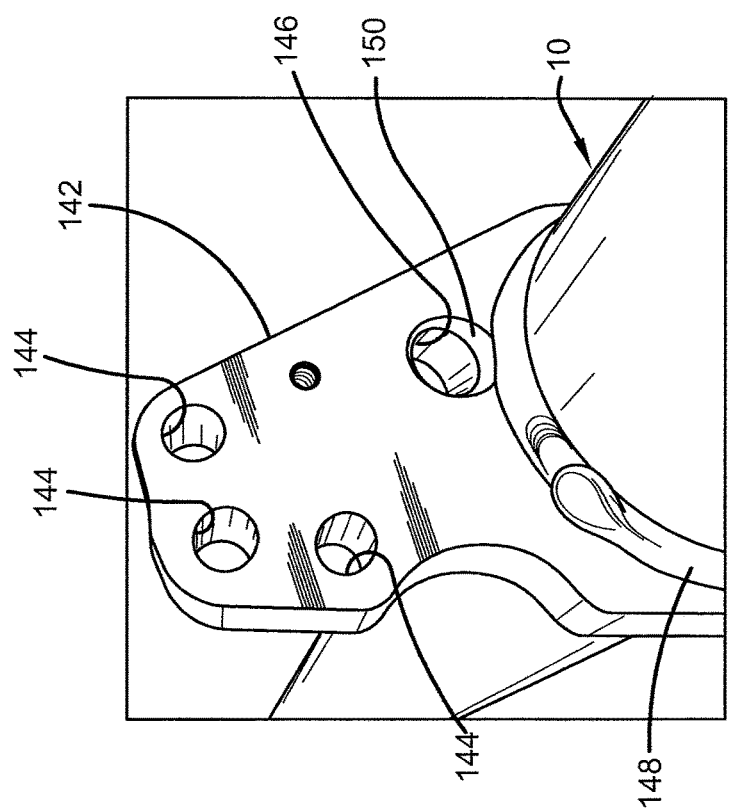
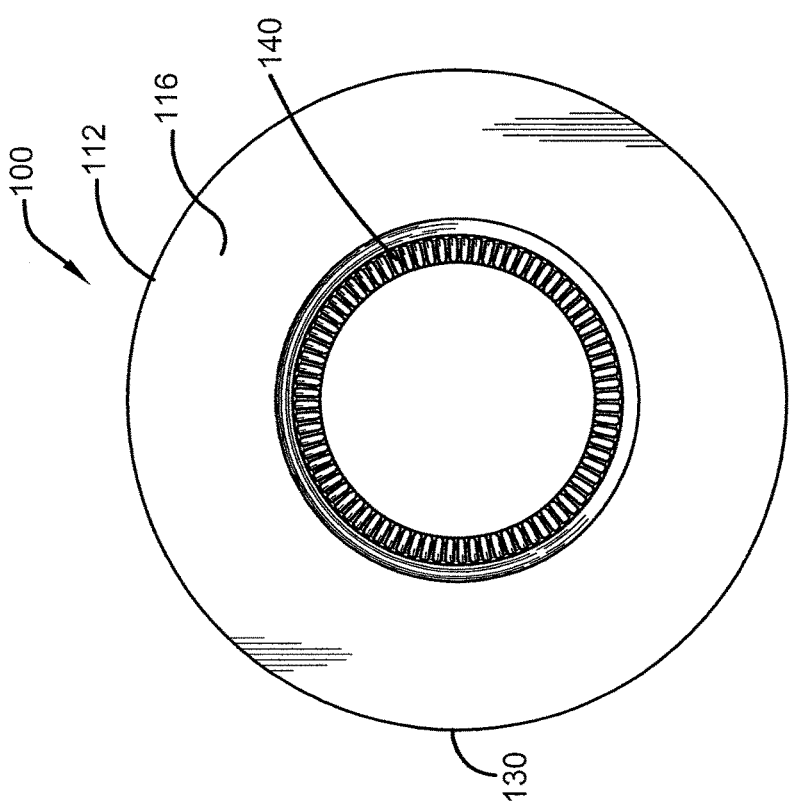

REDUCED-DIAMETER BRAKE ROTOR FOR HEAVY-DUTY VEHICLES

CROSS-REFERENCE TO RELATED APPLICATIONS

This application claims the benefit of U.S. Provisional Patent Application Ser. No. 62/014,871, which was filed on Jun. 20, 2014.

BACKGROUND OF THE INVENTION

Technical Field

The invention relates to the art of disc brakes for heavy-duty vehicles. More particularly, the invention relates to rotors of disc brakes for heavy-duty vehicles. Still more particularly, the invention is directed to a rotor of a disc brake, referred to herein as a brake rotor, which includes a reduced diameter for use in conjunction with reduced-diameter wheel end configurations, and which includes features that reduce the peak temperature of the rotor, reduce coning of the rotor during braking, and desirably maintain the heat transfer properties of the rotor while decreasing the brittleness and improving the hot strength of the rotor.

Background Art

Disc brake systems for vehicles are well known in the brake art. Such systems operate by forcing a pair of opposing brake pads against a rotor, thereby creating friction between the pads and the rotor to enable slowing and/or stopping of the vehicle. More particularly, a disc brake system includes a plurality of disc brake assemblies, in which each assembly is operatively mounted on or adjacent a wheel end of the vehicle.

Each disc brake assembly includes a carrier, which supports a caliper that is described in greater detail below, and is attached to a torque plate, typically by mechanical fasteners, such as bolts. The torque plate in turn is rigidly connected to an axle of an axle/suspension system of the vehicle, such as by welding. The torque plate resists the torque that is generated during braking, and maintains proper alignment of the carrier and caliper to ensure optimum operation of the components of the brake assembly.

As mentioned above, the carrier supports a caliper, and the caliper is formed with a bore for receiving one or more pistons and an actuator. The actuator typically is a brake air chamber, which is in fluid communication with a compressed air source and activates movement of the piston(s). The caliper also includes a reaction arm that is disposed opposite the piston(s). Each one of a pair of opposing brake pads includes friction material that is mounted on a backing plate, and is seated in the carrier, with one of the pads being adjacent the piston(s) and the other pad being adjacent the reaction arm. Upon actuation by the actuator, the piston(s) and the reaction arm cooperate to control movement of the brake pads.

The rotor includes a disc portion, which is disposed between the brake pads in a manner that allows the friction material of each pad to face a respective surface of the disc portion. The rotor also includes a mounting portion that is adapted for mounting to a respective wheel end assembly of the vehicle by mechanical fasteners, such as bolts. A sleeve typically is integrally formed with and extends between the disc portion and the mounting portion of the rotor. This construction enables the rotor to be rigidly connected to the wheel end assembly, and thus to a respective vehicle wheel.

In the prior art, many heavy-duty vehicles have employed a wheel that includes a diameter of 22.5 inches (571.5 millimeters). When an air disc brake system is employed in conjunction with such 22.5-inch wheels, the brake rotor diameter typically is about 16.9 inches (430 mm). In order to lower the floor height of a heavy-duty vehicle to increase the vertical space available for cargo, certain heavy-duty vehicle designs have moved from a 22.5 inch diameter wheel to a wheel with a reduced diameter. For example, such reduced-diameter wheel designs have employed a 17.5 inch (444.5 mm) diameter wheel, rather than a 22.5 inch diameter wheel.

In the prior art, it was common to employ a drum brake system with a 17.5 inch diameter wheel. Due to the improved performance characteristics of an air disc brake system when compared to a drum brake system, it is desirable to enable the use of an air disc brake system with a reduced-diameter 17.5 inch wheel, rather than a drum brake system. However, the use of an air disc brake system with a 17.5 inch wheel poses certain challenges.

For example, it is desirable for heavy-duty vehicles, including trailers that are classified as National Highway Traffic Safety Administration (NHTSA) Class 8 trailers, to maintain certain brake certifications, such as the Federal Motor Vehicle Safety Standards (FMVSS)-121 brake certifications for a 20,000 pound gross axle weight rating (GAWR). Such a rating is typical for air disc brakes that are employed with larger 22.5 inch diameter wheels, but poses a challenge for air disc brakes that are employed with reduced 17.5 inch diameter wheels.

More particularly, air disc brakes, including brake rotors, which are employed with a 17.5 inch diameter wheel are limited in their outer diameter, as they must be packaged so that their outer diameter is well inside of the 17.5 inch wheel diameter. Such air disc brakes are also limited in their inner diameter, as they must still clear the outer diameter of the axle, which is maintained at about a 5-inch outside diameter to adequately support the 20,000 pound GAWR. It is also desirable for an air disc brake system on such a heavy-duty vehicle to provide acceptable performance and life of the brake rotor and the brake pads.

Traditionally, prior art rotors in such a small air disc brake package, which are referred to herein for the purpose of convenience as reduced-diameter brake rotors, have been ventilated rotors, which are rotors that include two rotor discs with vanes or pins connecting the discs to one another. Because of the above-described outer diameter and inner diameter limitations, such ventilated rotors have had durability issues. More particularly, the frictional forces generated from braking impart high temperature cycles on the brake rotor. The highest temperature actually experienced by the rotor, which is known in the art as the peak temperature of the rotor, depends on the specific construction and features of each rotor. In the prior art, reduced-diameter ventilated rotors have experienced high peak temperatures that have caused them to undesirably wear out rapidly, and to experience thermal cracking of the rotor faces in demanding applications. Therefore, it is desirable to provide a reduced-diameter brake rotor with a construction that reduces the peak temperature of the rotor.

In addition, the mechanical connection between the brake rotor and the wheel hub enables heat transfer from the rotor to the wheel hub. When the rotor experiences high temperatures, such heat transfer in turn creates high temperatures in the wheel hub. High temperatures in the wheel hub can prematurely age the wheel seals and the lubricant in the hub, thereby undesirably shortening the service interval on the wheel end assembly. As a result, it is again desirable to provide a reduced-diameter brake rotor with a construction that reduces the peak temperature of the rotor, which reduces the heat that is transferred to the wheel hub and desirably extends the life of the hub seals and lubricant.

Moreover, for optimum functioning of the brake system, it is desirable for the disc portion of the rotor to be maintained in a vertical orientation, which provides a square, even contact of the inboard surface of the disc with the friction material of its adjacent brake pad, and a square, even contact of the outboard surface of the disc with the friction material of its adjacent brake pad. However, it is known in the art that the heat which is generated from the friction of the brake pads being forced against the disc portion of the rotor causes the disc portion to expand radially. In addition, the heat generated from the friction of the brake pads being forced against the disc portion of the rotor creates a thermal gradient across the rotor sleeve, with the sleeve being hotter in the inboard area that is adjacent the rotor disc portion than the outboard area that is away from the rotor disc portion. This thermal gradient causes the rotor sleeve to expand at the inboard area that is adjacent the rotor disc portion. The radial expansion of the disc portion of the rotor and the expansion of the rotor sleeve adjacent the rotor disc portion causes the outer perimeter of the disc portion to move slightly from its desired vertical orientation and in the direction of the rotor sleeve. The rotor disc portion thereby angles or tilts in the direction of the rotor sleeve, that is, in the outboard direction. Such tilting of the rotor disc portion due to the heat generated from braking is referred to in the art as coning.

When the rotor disc experiences coning, the inboard surface of the disc is no longer in square, even contact with the friction material of its adjacent brake pad, and the outboard surface of the disc is no longer in square, even contact with the friction material of its adjacent brake pad. Such uneven contact between the inboard surface and its adjacent brake pad, and the outboard surface and its adjacent brake pad, reduces the efficiency of the brake system. In addition, such uneven contact may create stress areas at each point of uneven contact between the brake pads and the inboard and outboard disc surfaces, which may cause the formation of cracks in the rotor disc, thereby reducing the life of the rotor. Such uneven contact between the inboard disc surface and its adjacent brake pad, and the outboard disc surface and its adjacent brake pad, also undesirably reduces the life of the brake pads. As a result, it is desirable to provide a reduced-diameter brake rotor construction that reduces potential coning, and in turn increases the life of the brake pads and the rotor.

Also, rotors for heavy-duty vehicles have traditionally been formed from cast iron in order to exhibit the strength, hardness and stability required for the braking operation. In the prior art, such rotors have been formed with a high carbon content to maintain the heat transfer properties of the rotor disc, which enables the rotor to dissipate heat to reduce the thermal stresses on the rotor, thereby improving the performance and life of the rotor. For example, in the prior art, the carbon content of a rotor has typically been greater than about four (4) weight percent (%) carbon. While such a high carbon content has provided good heat transfer properties, it creates a rotor that is undesirably brittle. When a rotor is brittle, it has little ability to resist high temperature stresses, and as a result, prior art rotors with a high carbon content may undesirably experience crack initiation and propagation. In addition, such a high carbon content undesirably reduces the strength of the rotor at elevated temperatures, which is also referred to in the art as a reduction of the rotor's hot strength. Therefore, it is desirable to provide a reduced-diameter brake rotor that includes a metallurgical composition which desirably maintains the heat transfer properties of the rotor, while decreasing the brittleness and improving the hot strength associated with prior art high-carbon compositions.

As a result, there is a need in the art for a reduced-diameter brake rotor for heavy-duty vehicles that provides a construction that reduces the peak temperature of the rotor, reduces coning of the rotor during braking, and includes a metallurgical composition which desirably maintains the heat transfer properties of the rotor, while decreasing the brittleness and improving the hot strength of the rotor. The reduced-diameter brake rotor for heavy-duty vehicles of the present invention satisfies these needs, as will be described in detail below.

BRIEF SUMMARY OF THE INVENTION

An objective of the present invention is to provide a reduced-diameter brake rotor for heavy-duty vehicles that provides a construction that reduces the peak temperature of the rotor.

Another objective of the present invention is to provide a reduced-diameter brake rotor for heavy-duty vehicles that reduces coning of the rotor during braking.

Still another objective of the present invention is to provide a reduced-diameter brake rotor for heavy-duty vehicles that includes a metallurgical composition which desirably maintains the heat transfer properties of the rotor while decreasing the brittleness and improving the hot strength of the rotor.

These objectives and others are obtained by the reduced-diameter brake rotor for heavy-duty vehicles of the present invention. In an exemplary embodiment of the invention, the rotor includes a radially-extending disc, which in turn includes an inboard surface and an outboard surface, and a solid, constant cross-section between the inboard and outboard surfaces. A radially-extending mounting flange enables mounting of the rotor to a wheel hub of the vehicle, and an axially-extending sleeve is integrally formed with and extends between the disc and the mounting flange.

BRIEF DESCRIPTION OF THE SEVERAL VIEWS OF THE DRAWINGS

The preferred embodiment of the invention, illustrative of the best mode in which Applicant has contemplated applying the principles of the invention, is set forth in the following description and is shown in the drawings, and is particularly and distinctly pointed out and set forth in the appended claims.

FIG. 7 is an inboard elevational view of the reduced-diameter brake rotor shown in FIG. 2;

FIG. 8 is a fragmentary perspective view of an exemplary torque plate used in conjunction with the reduced-diameter brake rotor for heavy-duty vehicles of the present invention, as welded to an axle;

Similar numerals refer to similar parts throughout the drawings.

DETAILED DESCRIPTION OF THE INVENTION

Figure 1:
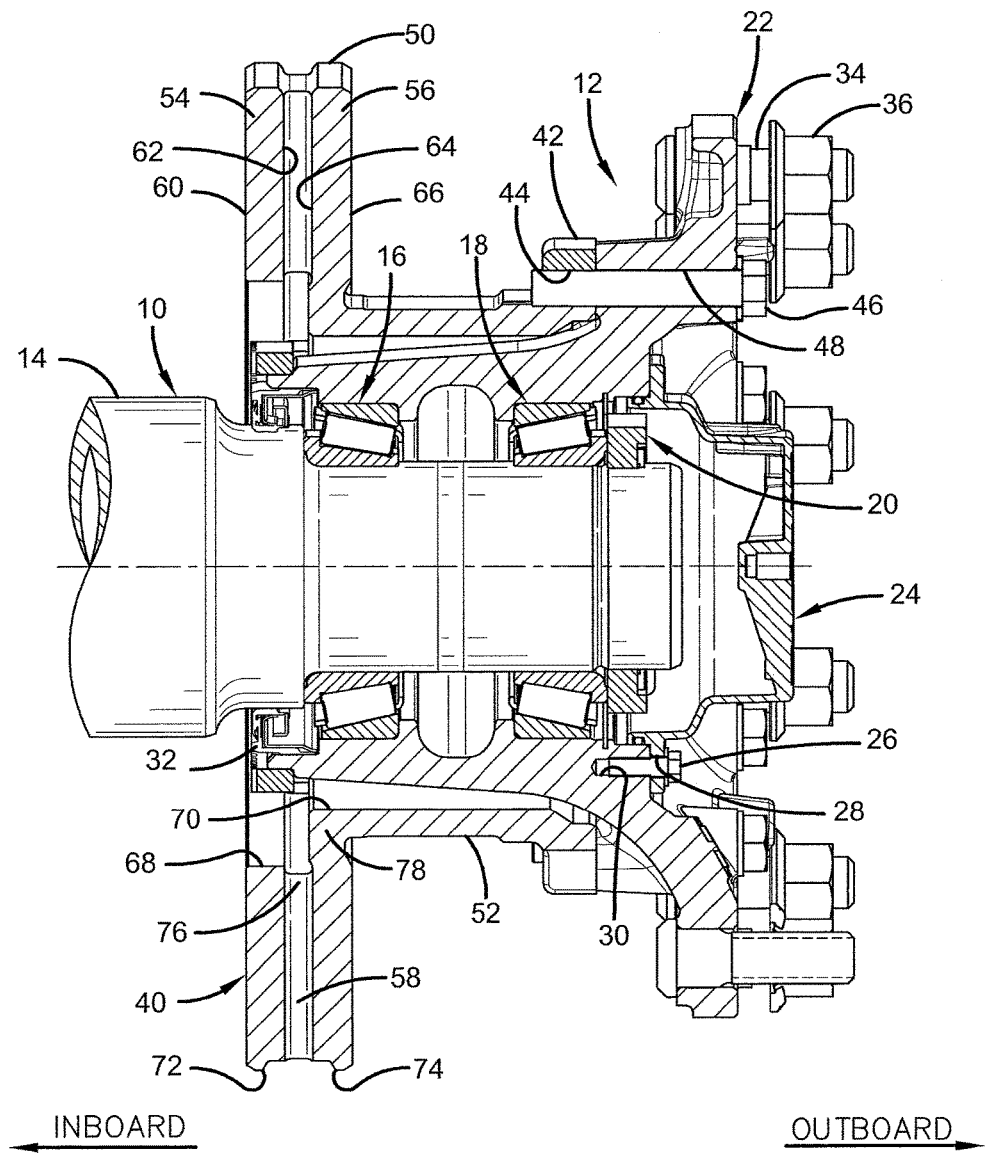
FIG. 1 is a fragmentary side elevational view, shown partially in cross section, of a prior art disc brake rotor for heavy-duty vehicles, attached to a wheel end assembly that is mounted on an axle spindle.

In order to better understand the improved disc brake rotor for heavy-duty vehicles of the present invention and the environment in which it operates, a prior art disc brake rotor for heavy-duty vehicles 40 is shown in FIG. 1, and now will be described. The environment for rotor 40 includes one or more axles 10, which typically depend from and extend transversely across a heavy-duty vehicle (not shown). Heavy-duty vehicles include trucks and tractor-trailers or semi-trailers, and the tractor-trailers or semi-trailers typically are equipped with one or more trailers. Reference herein shall be made generally to a heavy-duty vehicle for the purpose of convenience, with the understanding that such reference includes trucks, tractor-trailers and semi-trailers, and trailers thereof. Each axle 10 has two ends, with a wheel end assembly 12 mounted on each one of the ends. For the purposes of convenience and clarity, only one end of axle 10 and its respective wheel end assembly 12 will be described herein.

Axle 10 includes a central tube (not shown), and an axle spindle 14 is integrally connected, by any suitable means such as welding, to each end of the central tube. Wheel end assembly 12 includes a bearing assembly having an inboard bearing 16 and an outboard bearing 18 immovably mounted on the outboard end of axle spindle 14. A spindle nut assembly 20 threadably engages the outboard end of axle spindle 14 and secures bearings 16, 18 in place. A wheel hub 22 is rotatably mounted on inboard and outboard bearings 16, 18 in a manner well known to those skilled in the art.

A hub cap 24 is mounted on the outboard end of hub 22 by a plurality of bolts 26, each one of which passes through a respective one of a plurality of openings 28 formed in the hub cap, and threadably engages a respective one of a plurality of aligned threaded openings 30 formed in the hub. In this manner, hub cap 24 closes the outboard end of wheel end assembly 12. A main continuous seal 32 is rotatably mounted on the inboard end of wheel end assembly 12 and closes the inboard end of the assembly. In a typical heavy-duty vehicle dual-wheel configuration, a plurality of threaded bolts 34 and mating nuts 36 are used to mount one tire rim or a pair of tire rims (not shown), depending on specific design considerations, on wheel end assembly 12. Each one of a pair of tires (not shown) is mounted on a respective one of the tire rims, as known in the art.

Rotor 40 includes a radially-extending mounting portion or flange 42, which is formed with openings 44 to receive mechanical fasteners 46, such as bolts. Hub 22 is formed with corresponding openings 48, thereby enabling bolts 46 to pass through aligned ones of the hub openings and rotor flange openings 44 to removably secure rotor 40 to the hub. This construction enables rotor 40 to rotate with hub 22, while being removable from the hub for servicing.

Rotor 40 also includes a radially-extending disc portion 50, the construction of which will be described in greater detail below. Disc portion 50 is disposed between a pair of opposing brake pads (not shown) in a manner known in the art. An axially-extending rotor sleeve 52 is integrally formed with and extends between disc portion 50 and mounting flange 42. Sleeve 52 enables rotor disc portion 50 to be rigidly connected to mounting flange 42 and thus wheel end assembly 12.

Disc portion 50 of prior art rotor 40 includes an inboard disc 54 and an outboard disc 56, which are spaced apart from one another and are interconnected by a plurality of vanes 58. More particularly, inboard disc 54 includes an inboard surface 60 and an outboard surface 62, and outboard disc 56 includes an inboard surface 64 and an outboard surface 66. Inboard surface 60 of inboard disc 54 is adjacent the friction material of a respective one of a pair of brake pads (not shown), and outboard surface 66 of outboard disc 56 is adjacent to the friction material of the other one of the pair of brake pads. Outboard surface 62 of inboard disc 54 and inboard surface 64 of outboard disc 56 face one another or are opposed, and vanes 58 are integrally formed with and extend between these surfaces. Vanes 58 are thick ribbon-like structural members that extend radially from an inner perimeter 68 of inboard disc 54 and an inner perimeter 70 of outboard disc 56 to an outer perimeter 72 of the inboard disc and an outer perimeter 74 of the outboard disc, respectively. In this manner, vanes 58 provide a rigid connection between inboard disc 54 and outboard disc 56, while forming radially-extending air passages 76 between the vanes.

The integral connection of disc portion 50 and sleeve 52 includes a bend 78. More particularly, radially-extending outboard disc 56 and axially-extending sleeve 52 meet at ninety-degree bend 78. This connection of sleeve 52 to outboard disc 56 of disc portion 50 is typical in the prior art, as it is convenient to connect the sleeve, which is disposed axially outboardly of the disc portion, to the outboard disc.

Prior art rotor 40 typically is formed of cast iron with a high carbon content to maintain the heat transfer properties of disc portion 50 in order to dissipate heat that is generated by friction during the braking operation. For example, prior art rotor 40 includes a carbon content that is greater than about four (4) weight percent (%) carbon.

Prior art rotor 40, while satisfactory for its intended purpose, includes certain disadvantages. For example, when prior art rotor 40 is a reduced-diameter brake rotor, that is, a rotor that is employed with a 17.5 inch diameter wheel, disc portion 50 of prior art rotor 40, including inboard disc 54 and outboard disc 56, experiences durability issues. More particularly, prior art reduced-diameter ventilated rotors 40 experience high peak temperatures due to the frictional forces from braking, which have caused them to undesirably wear out rapidly, and to experience thermal cracking of inboard surface 60 of inboard disc 54 and outboard surface 66 of outboard disc 56.

Also, the mechanical connection between rotor 40 and wheel hub 22 enables high heat transfer from the rotor to the wheel hub, which creates high temperatures in the wheel hub. Such high temperatures can prematurely age main seal 32, the seal of hubcap 24, and the lubricant in hub 22, thereby undesirably shortening the service interval on the wheel end assembly.

In addition, the radial expansion of rotor disc portion 50 and the expansion of rotor sleeve 52 adjacent the rotor disc portion due to heat from braking causes coning of the disc portion in the direction of the sleeve, that is, in an outboard direction. Such coning may undesirably create uneven contact between inboard disc 54 and its adjacent brake pad, and outboard disc 56 and its adjacent brake pad, reducing the efficiency of the brake system, and the life of the brake pads. Such coning may also undesirably increase the stress at each point of uneven contact between the brake pads and each respective inboard disc 54 and outboard disc 56, which may in turn increase the tendency of cracks to form and enlarge or propagate in rotor disc portion 50, thereby reducing the life of rotor 40.

Moreover, prior art rotor 40 includes a carbon content that is greater than about four (4) weight percent (%) carbon, which is a high carbon content that provides good heat transfer properties, but makes the rotor undesirably brittle and may thus undesirably allow the rotor to experience crack initiation and propagation, and undesirably reduces the hot strength of the rotor.

As a result, there is a need in the art for a reduced-diameter brake rotor for heavy-duty vehicles that provides a construction that reduces the peak temperature of the rotor, reduces coning of the rotor during braking, and includes a metallurgical composition which desirably maintains the heat transfer properties of the rotor, while decreasing the brittleness and improving the hot strength of the rotor. The reduced diameter brake rotor for heavy-duty vehicles of the present invention satisfies these needs, as now will be described.

Figure 3:
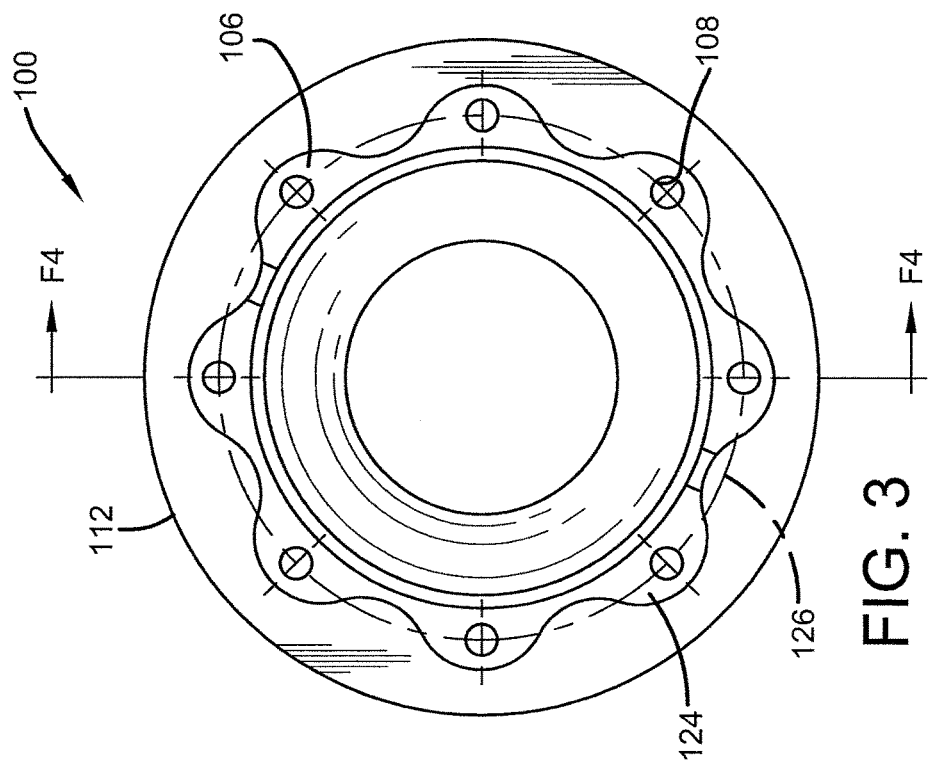
FIG. 3 is an outboard elevational view of the reduced-diameter brake rotor shown in FIG. 2.
Figure 2:
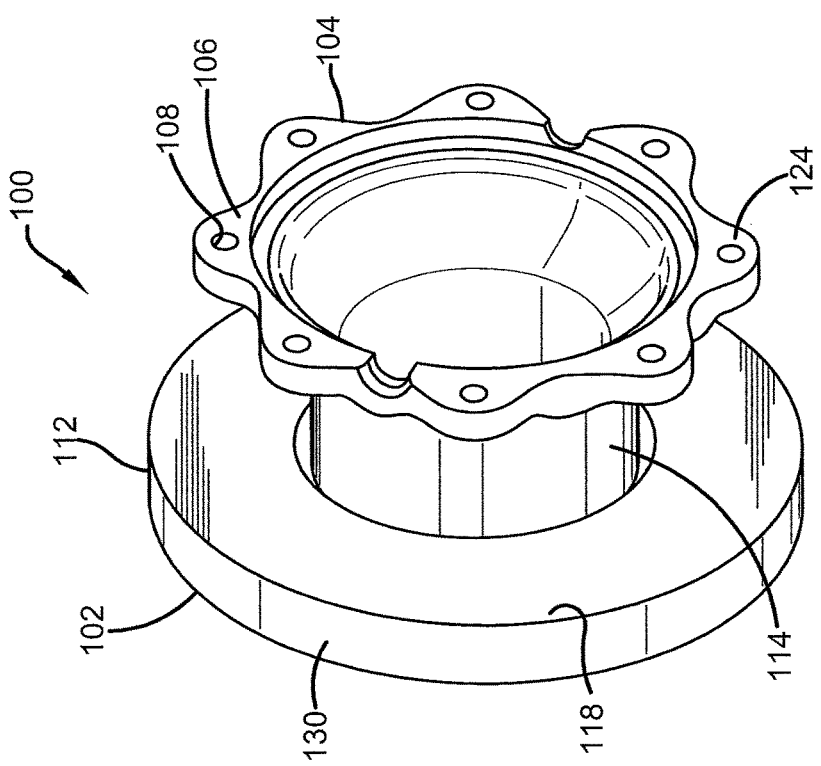
FIG. 2 is an outboard perspective view of an exemplary embodiment of the reduced-diameter brake rotor for heavy-duty vehicles of the present invention.
Figure 4:
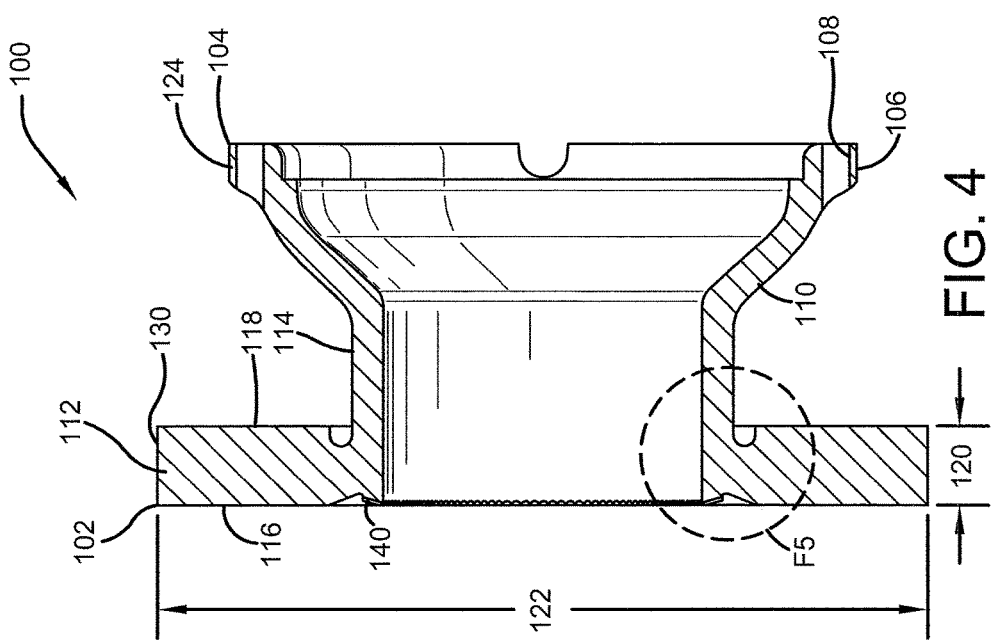
FIG. 4 is a cross-sectional view of the reduced-diameter brake rotor taken along line F4-F4 in FIG. 3.

An exemplary embodiment of a reduced-diameter brake rotor for heavy-duty vehicles of the present invention is shown in FIGS. 2-7 and is indicated generally at 100. With reference to FIGS. 2-4, reduced-diameter brake rotor 100 includes an inboard end 102 and an outboard end 104. At outboard end 104, rotor 100 includes a radially-extending mounting portion or flange 106, which is formed with openings 108 to receive mechanical fasteners 46 (FIG. 1), such as bolts. Wheel hub 22 (FIG. 1) is formed with corresponding openings 48, thereby enabling bolts 46 to pass through aligned ones of the hub openings and rotor flange openings 108 to removably secure rotor 100 to the hub. This construction enables rotor 100 to rotate with hub 22, while being removable from the hub for servicing.

At inboard end 102, rotor 100 includes a radially-extending disc 112, the construction of which will be described in greater detail below. Disc 112 is disposed between a pair of opposing brake pads (not shown) in a manner known in the art. An axially-extending rotor sleeve 114 is integrally formed with and extends between disc 112 and mounting flange 106. Sleeve 114 enables rotor disc 112 to be rigidly connected to mounting flange 106 and thus wheel end assembly 12 (FIG. 1). Providing a transition from smaller-diameter sleeve 114 to larger-diameter mounting flange 106 is an angled bell portion 110, which may be considered to be a part of the mounting flange.

With particular reference to FIG. 4, disc 112 of rotor 100 includes an inboard surface 116 and an outboard surface 118. Inboard surface 116 is adjacent the friction material of a respective one of a pair of brake pads (not shown), and outboard surface 118 is adjacent to the friction material of the other one of the pair of brake pads. Because rotor 100 is a reduced-diameter brake rotor, disc 112 preferably includes an outer diameter, indicated by 122, of from about 320 millimeters (mm) to about 330 mm.

A feature of the invention is that disc 112 of rotor 100 is solid. That is, rotor disc 112 has a constant cross-section between inboard surface 116 and outboard surface 118, respectively. By providing solid disc 112, ventilation channels 76 between prior art rotor discs 54, 56 (FIG. 1) are eliminated, enabling rotor 100 of the invention to add mass to the working area of the disc 112. In this manner, the mass of rotor 100 of the invention has been increased, while maintaining the rotor in a small packaging configuration for a 17.5 inch diameter wheel and a 5 inch diameter axle. Adding such mass reduces peak rotor temperatures, which in turn extends the life of rotor 100 and reduces thermal cracking of rotor disc inboard surface 116 and outboard surface 118, respectively. In addition, the increased mass of disc 112 desirably decreases heat transfer at bearings 16, 18 and main seal 32 of wheel end assembly 12 (FIG. 1), thereby increasing the performance and life of these components.

In order to further increase the mass of rotor disc 112, the thickness of the disc may also be increased. As shown in FIG. 4, the thickness of rotor disc 112 is the distance between inboard surface 116 and outboard surface 118, which is indicated at 120. For example, when rotor disc 112 includes outer diameter 122 of from about 320 mm to about 330 mm, thickness 120 is from about 30 mm to about 45 mm, and a preferred thickness is about 34 mm. Increasing the mass of rotor 100 by increasing thickness 120 of rotor disc 112 improves the ability of the rotor to handle the heat due to braking, and desirably decreases heat transfer to increase the performance and life of bearings 16, 18 and main seal 32.

Figure 6A:
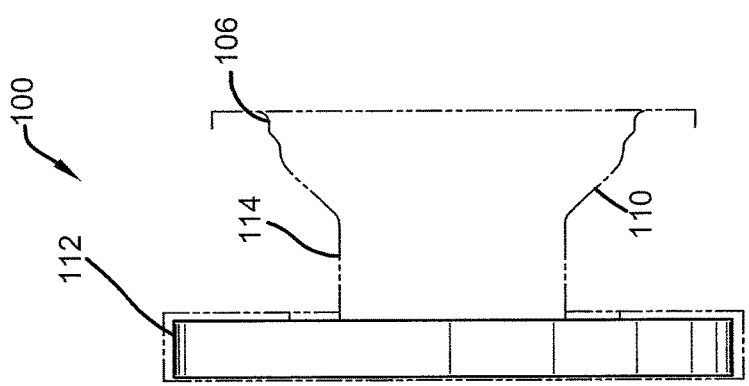
FIG. 6A is a schematic diagram from a side elevational view of a portion of an exemplary embodiment of the reduced-diameter brake rotor for heavy-duty vehicles of the present invention.
Figure 6B:
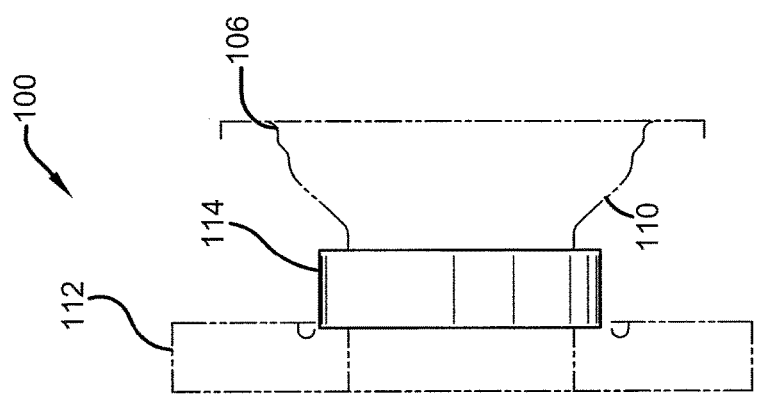
FIG. 6B is a schematic diagram from a side elevational view of another portion of the exemplary embodiment of the reduced-diameter brake rotor.
Figure 6C:
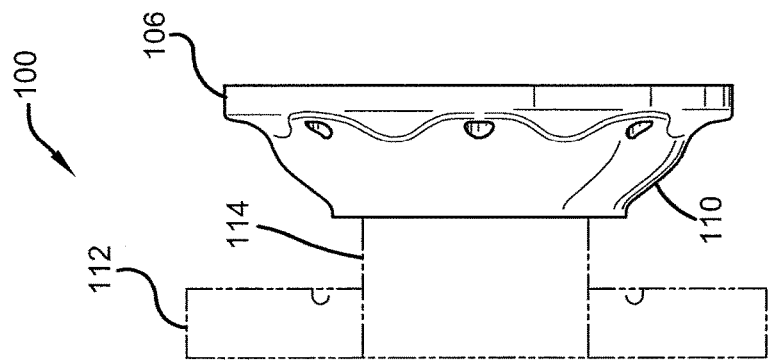
FIG. 6C is a schematic diagram from a side elevational view of yet another portion of the exemplary embodiment of the reduced-diameter brake rotor.

For purposes of comparison, prior art reduced-diameter ventilated rotor 40, which is employed with a 17.5 inch diameter wheel (not shown), weighs about 41 pounds (lbs). For rotor 100 of the invention with a preferred disc outer diameter 122 of about 325 mm and a preferred disc thickness 120 of about 34 mm, the overall mass of the rotor is about 53.49 lbs, which is an increase of about 30 percent (%) over prior art rotor 40. By way of example, a preferred weight distribution of rotor 100 is shown in FIGS. 6A-6C. With reference to FIG. 6A, solid disc 112 of rotor 100 weighs about 36.16 lbs. As indicated by FIG. 6B, axial sleeve 114 weighs about 4.29 lbs. As indicated by FIG. 6C, bell 110 and mounting flange 106 weigh about 13.03 lbs, which yields a total of about 53.49 lbs for rotor 100.

The increased mass of reduced-diameter brake rotor 100 of the invention may be expressed as a ratio R1. Ratio R1 is the value of the overall weight of rotor 100 divided by the value of outer diameter 122 of disc 112. For example, when rotor 100 of the invention includes a preferred disc outer diameter 122 of about 325 mm, or about 12.8 in, and a preferred disc thickness 120 of about 34 mm, ratio R1 is 53.49 lbs divided by 12.8 in, which yields a value of about 4.2 lbs/in. Ratio R1 may alternatively be expressed as 24.3 kg divided by 325 mm, which yields a value of about 0.75 kg/mm.

The increased mass of reduced-diameter brake rotor 100 of the invention may also be expressed as an additional or alternative ratio R2. More particularly, as is known in the art, when axle 10 includes a 20,000 lb gross axle weight rating (GAWR), each wheel end assembly 12 (FIG. 1) is typically tested at its respective half of the weight rating, which is 10,000 lbs. Ratio R2 is the value of the test requirement of 10,000 lbs divided by weight of rotor disc 112. As described above, solid disc 112 of rotor 100 of the invention weighs about 36.16 lbs. When the mass of solid disc 112 of rotor 100 is compared to its test requirement of 10,000 lbs by dividing the test requirement by the weight, the resulting value for ratio R2 is about 277. If additional mass is added to rotor disc 112, the value of ratio R2 decreases. Therefore, the preferred value for ratio R2 for rotor 100 of the invention is a value of about 280 or less.

Another ratio, R3, also illustrates the increased mass of reduced-diameter brake rotor 100 of the invention. Specifically, ratio R3 is the value of the test requirement of 10,000 lbs divided by the overall weight of rotor 100. As described above, the overall weight of rotor 100 is about 53.49 lbs. When the overall weight or mass of rotor 100 of 53.49 lbs is compared to its test requirement of 10,000 lbs by dividing the test requirement by the weight, the resulting value for ratio R3 is about 187. Similar to ratio R2 as described above, if additional mass is added to rotor 100, the value of ratio R3 decreases. As a result, the preferred value for ratio R2 for rotor 100 of the invention is a value of about 190 or less.

Ratios R2 and R3 each indicate the mass of rotor 100 in view of its test requirements, which in turn demonstrates the desirable ability of the rotor of the invention to protect against thermal spikes due to the braking operation for a loaded vehicle.

With particular reference to FIGS. 3 and 4, another feature of rotor 100 of the present invention is a large interface of rotor 100 to wheel hub 22 (FIG. 1), which further increases the mass of the rotor. More particularly, as described above, angled bell portion 110 provides a transition from smaller-diameter sleeve 114 to larger-diameter mounting flange 106. Mounting flange 106 is formed with large radially-outwardly extending projections 124, each one of which is formed with a respective one of bolt openings 108. Projections 124 enable rotor 100 to maintain a large-diameter bolt circle 126, and preferably a robust 8-bolt circle. To secure rotor 100 to wheel hub 22, each bolt opening 108 aligns with a corresponding bolt opening 48 (FIG. 1) formed in the wheel hub, and each set of aligned openings receives a respective bolt 46. In this manner, mounting flange 106 and its projections 124 provide a large and robust interface of rotor 100 to wheel hub 22. Because bell portion 110 provides a transition to mounting flange 106 that is angled radially outwardly, the mounting flange includes a relatively large outer diameter. In addition, because projections 124 extend radially outwardly, the outer diameter of mounting flange 106, and thus the interface of rotor 100 to wheel hub 22, is further increased.

The large interface of rotor 100 to wheel hub 22 may be expressed as a ratio R4. Ratio R4 is the value of the diameter of bolt circle 126 divided by the value of outer diameter 122 of disc 112. When rotor disc 112 includes outer diameter 122 of about 325 mm, the diameter of bolt circle 126 preferably is about 249.5 mm diameter. Ratio R4 of the diameter of bolt circle 126 to rotor disc diameter 122 yields a value of about 0.77. By providing such a large interface to wheel hub 22, the mass of rotor 100 is increased, which increases the stability of the connection of the rotor to the hub. In addition, the increase of mass of rotor 100 at the interface with wheel hub 22 desirably reduces the heat that is transferred from the rotor to the wheel hub, which in turn reduces the peak temperature spikes experienced by wheel end main end seal 32 (FIG. 1) and lubricant, thereby desirably extending the life of the seal, lubricant, and bearings 16, 18.

Moreover, projections 124 and bolt openings 108 of rotor 100 of the invention are separate from wheel studs 34 (FIG. 1). By providing an arrangement in which bolt openings 108 for wheel hub 22 are separate from wheel studs 34, hub attachment bolts 46 are radially distant from bearings 16, 18, and are between the wheel studs. Locating hub attachment bolts 46 radially distant from bearings 16, 18, and between wheel studs 34 enables easier removal of rotor 100 from hub 22, and desirably reduces heat transfer from rotor 100 to the lubricant in the hub, the bearings, and main seal 32. More particularly, such a reduction of heat transfer is accomplished by moving the heat transfer point closer to the wheel mass and away from bearings 16, 18, and desirably extends the life of the lubricant, the bearings, and main seal 32.

Figure 5:
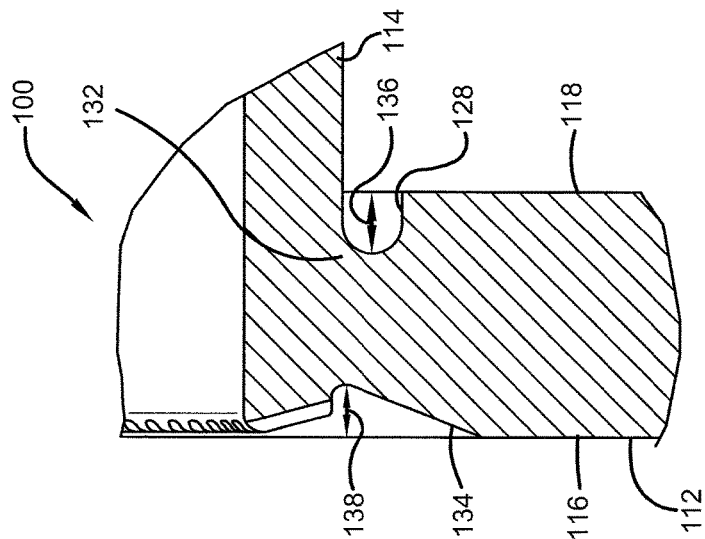
FIG. 5 is an enlarged fragmentary cross-sectional view of a portion of the reduced-diameter brake rotor taken from the enclosed area labeled F5 in FIG. 4.

Turning to FIGS. 4 and 5, yet another feature of rotor 100 of the present invention is an undercut 128 formed in outboard surface 118 of rotor disc 112. As described above, the heat which is generated from the friction of the brake pads (not shown) being forced against disc 112 causes the disc to expand radially. In addition, the heat generated from the friction of the brake pads being forced against disc 112 creates a thermal gradient across sleeve 114, with the area of the sleeve adjacent the disc being hotter than the area of the sleeve adjacent bell portion 110. This thermal gradient causes rotor sleeve 114 to expand adjacent disc 112. The radial expansion of disc 112 and the expansion of sleeve 114 adjacent the disc causes an outer perimeter 130 of the disc to move slightly from its desired vertical orientation and in the direction of the sleeve. The disc 112 thereby angles or tilts in the direction of sleeve 114, which is referred to in the art as coning.

Undercut 128 limits the amount of mass of reduced-diameter brake rotor 100 in such a confined, reduced-diameter space, and thereby helps to counter coning. More particularly, undercut 128 is formed as a channel at point 132, which is where outboard surface 118 of disc 112 meets sleeve 114, and includes a minimum depth 136 of about 8 mm. In addition, inboard surface 116 of disc 112 preferably is formed with a relief area 134 directly opposite from undercut 128. Relief area 134 may be employed in conjunction with undercut 128 to further counter coning, as the relief area provides a centered heat sink off of inboard surface 116 of disc 112. Preferably, relief area 134 is formed at a depth 138 that is smaller or shallower than depth 136 of undercut 128.

Rotor 100, by providing undercut 128 and optional relief area 134, enables the radial expansion of disc 112 to balance out with the tapered expansion of sleeve 114, thereby reducing or eliminating coning. Such a reduction or an elimination of coning promotes uniform contact between inboard surface 116 and its adjacent brake pad (not shown), and outboard surface 118 and its adjacent brake pad (not shown), thereby optimizing the efficiency of the brake system and increasing the life of the brake pads. Such a reduction or an elimination of coning also desirably reduces the stress at each point of contact between the brake pads and each respective inboard surface 116 and outboard surface 118 of disc 112 when compared to prior art rotor 40, which may in turn decrease the tendency of cracks to form in the disc, thereby increasing the life of rotor 100.

Still another feature of rotor 100 of the present invention is the composition of the rotor. More particularly, rotor 100 employs alloying of grey iron to increase hot strength mechanical properties over prior art non-alloyed grey iron. It is to be understood any alloying of grey iron may be employed for rotor 100. For example, prior art rotors 40 are formed of cast iron with a high carbon content, that is, a carbon content that is greater than about four (4) weight percent (%) carbon. Such a high carbon content maintains the heat transfer properties of such prior art rotors 40, but creates undesirable brittleness that in turn undesirably enables rapid crack initiation and propagation in the rotors, and which reduces the hot strength of the rotors.

Rotor 100 of the invention preferably is formed with a composition that includes alloying of grey iron to maintain the heat transfer properties of disc 112, while reducing brittleness and improving the hot strength. For example, the composition of rotor 100 may include optimizing the ratio of carbon, silicon, and vanadium used to form the rotor. By way of further example, rotor 100 of the invention may include a carbon content of from about 2.80 to about 3.20 weight percent, rather about than four (4) or more percent. Such an amount of carbon maintains the hardness of rotor disc 112, while reducing the brittleness imparted by higher amounts of carbon and improving the hot strength of rotor 100. To maintain the heat transfer properties of disc 112, rotor 100 of the invention may include a silicon content of from about 1.80 to about 1.95 weight percent, and a vanadium content of from about 0.05 to about 0.15 weight percent.

By way of additional example, rotor 100 of the invention preferably includes the following additional additives: manganese, from about 0.62 to about 0.80 weight percent; sulfur, a maximum of about 0.12 weight percent; phosphorous, a maximum of about 0.10 weight percent; chromium, from about 0.25 to about 0.30 weight percent; copper, from about 0.60 to about 0.75 weight percent; nickel, a maximum of about 0.05 weight percent; molybdenum, from about 0.10 to about 0.15 weight percent, titanium, a maximum of about 0.03 weight percent; aluminum, a maximum of about 0.01 weight percent; tin, a maximum of about 0.08 weight percent; and carbon equivalents, from about 3.40 to about 3.90 weight percent.

This composition of rotor 100 of the invention, and particularly the composition that includes alloying of grey iron, and optional aspects of the carbon content, silicon content, and vanadium content, desirably maintains the heat transfer properties of the rotor, while reducing the brittleness associated with prior art high-carbon compositions. Such a reduction in brittleness desirably reduces rapid initiation and propagation of cracks in disc 112, thereby improving the performance and life of rotor 100. The composition of rotor 100 also and improves the hot strength of the rotor, which further improves its performance and life. In addition, the cost associated with the above-described composition of rotor 100 is desirably more economical than that of prior art rotors. As mentioned above, the described composition of rotor 100 is by way of example, as it is to be understood any alloying of grey iron may be employed for the rotor.

Turning now to FIG. 7, another feature of rotor 100 of the invention is the integration of an anti-lock braking system (ABS) tone ring 140 into inboard surface 116 of rotor disc 112. Integration of tone ring 140 into inboard surface 116 of disc 112 and thus rotor 100 enables the corresponding ABS sensor (not shown) to be disposed in a protected location. Such placement in a protected location desirably reduces issues that may be experienced by tone ring 140 when compared to prior art tone rings (not shown), which have been attached separately to rotor 40, or mounted as separate components, thereby subjecting them to damage during vehicle operation.

With additional reference to FIG. 8, a torque plate 142 is rigidly connected to axle 10, and includes openings 144 to receive fasteners (not shown) that enable the torque plate to attach to and support a caliper (not shown) of the disc brake assembly that employs rotor 100. In conjunction with tone ring 140, torque plate 142 used in conjunction with rotor 100 preferably is formed with an opening 146 for receiving and mounting an ABS sensor (not shown). ABS sensor opening 146 includes an angled orientation 150 for the tone ring sensor of about 15 degrees, targeting a 150 mm pitch circle. Such a position of tone ring 140 in inboard surface 116 of rotor disc 112 and angle 150 of ABS sensor opening 146 enables torque plate 142 and an ABS sensor support (not shown) to be constructed so that the torque plate can be welded to the axle with a continuous weld 148. In the prior art, the position of the tone ring and the ABS sensor have dictated the use of interrupted welds to attach a torque plate to axle 10, which have reduced fatigue strength when compared to continuous weld 148. Therefore, the use of tone ring 140 and angled ABS sensor opening 146 enable the use of continuous weld 148, which in turn improves the fatigue strength of the connection of torque plate 142 to axle 10 when compared to the prior art use of an interrupted weld.

Reduced-diameter brake rotor 100 of the invention was compared to a prior art ventilated reduced-diameter brake rotor similar to brake rotor 40 (FIG. 1) in dynamometer testing. It is to be understood that dynamometer testing according to Federal Motor Vehicle Safety Standards (FMVSS)-121 brake certification standards requires that a wheel is not over the brake during testing. By not having a wheel in place for the testing, air is allowed to directly impinge rotor 40, 100 and create artificial cooling that is not present when a wheel surrounds the brake. In such testing, it desirable for a brake system to not fade too quickly, while being able to recover from braking quickly.

Both brake rotors 40, 100 were employed in the same overall air disc brake system setup, known in the art as a PAN17 system (PAN is a registered trademark of Wabco IP Holdings LLC), with the same friction material, known in the art as Jurid 539-20 (Jurid is a registered trademark of Honeywell International Inc.), so that the only variable was the rotor. Prior art rotor 40 was a ventilated rotor with an outer diameter of 325 mm and a disc thickness of 34 mm, and rotor of the invention 100 was a solid-disc rotor with an outer diameter of 325 mm and a disc thickness of 34 mm.

In a first round of testing according to the FMVSS-121 standards, which require that a wheel is not over the brake during testing, it was observed that prior art rotor 40 required higher brake pressures to maintain deceleration of a hot brake compared to solid-disc rotor 100 of the invention. Though it has been taught in the art that rotor 40 with a ventilated disc provides a superior cooling design, the testing indicated that the prior art rotor undesirably required higher brake pressures to maintain deceleration of a hot brake than solid-disc rotor 100.

In a second round of testing, a wheel (not shown) was installed. In this testing, prior art rotor 40 required even higher pressure to maintain the deceleration level than was required without the wheel. Also, rotor 100 of the invention did not experience a degradation in performance when the wheel was installed.

Figure 9:
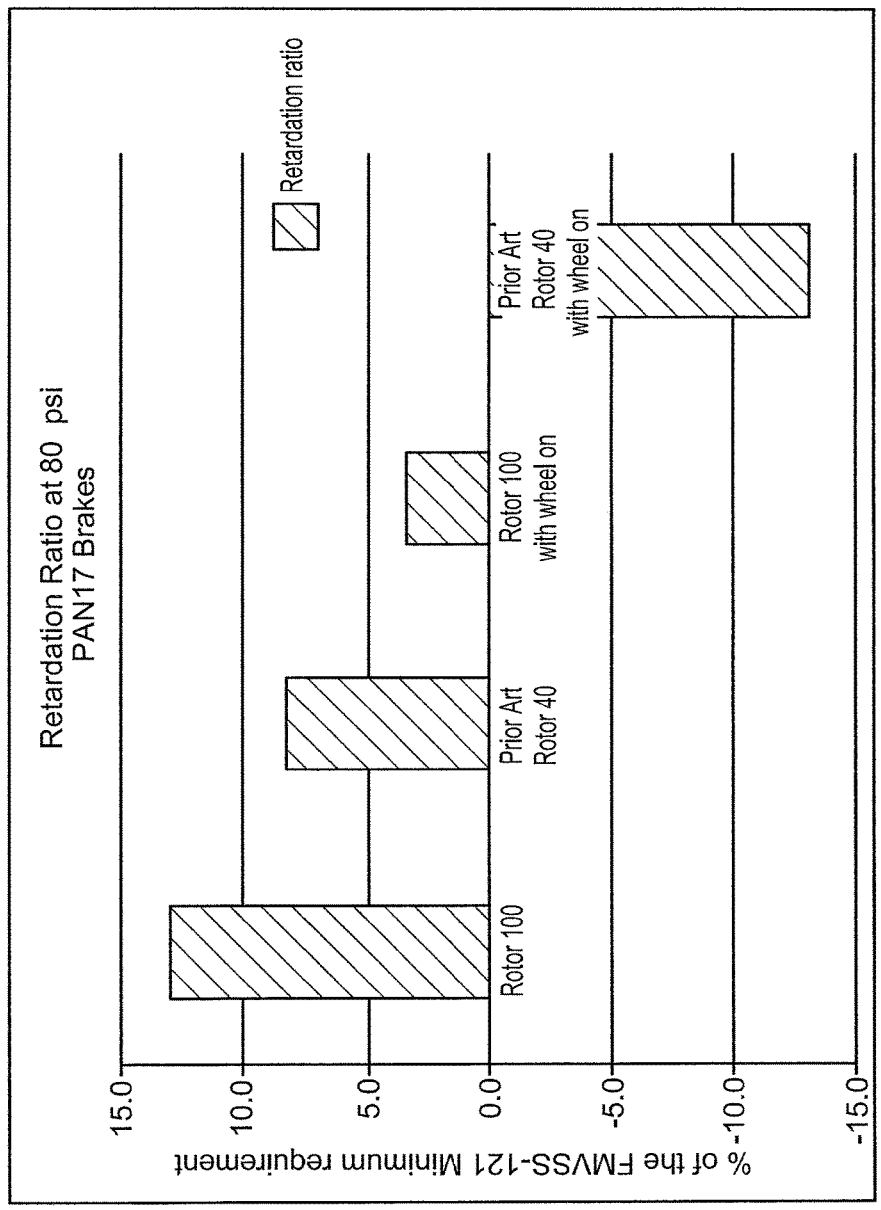
FIG. 9 is a plot of the retardation ratio at 80 pounds per square inch (psi) of an exemplary embodiment of the reduced-diameter brake rotor for heavy-duty vehicles of the present invention, and of an exemplary prior art reduced-diameter brake rotor for heavy-duty vehicles.
Figure 10:
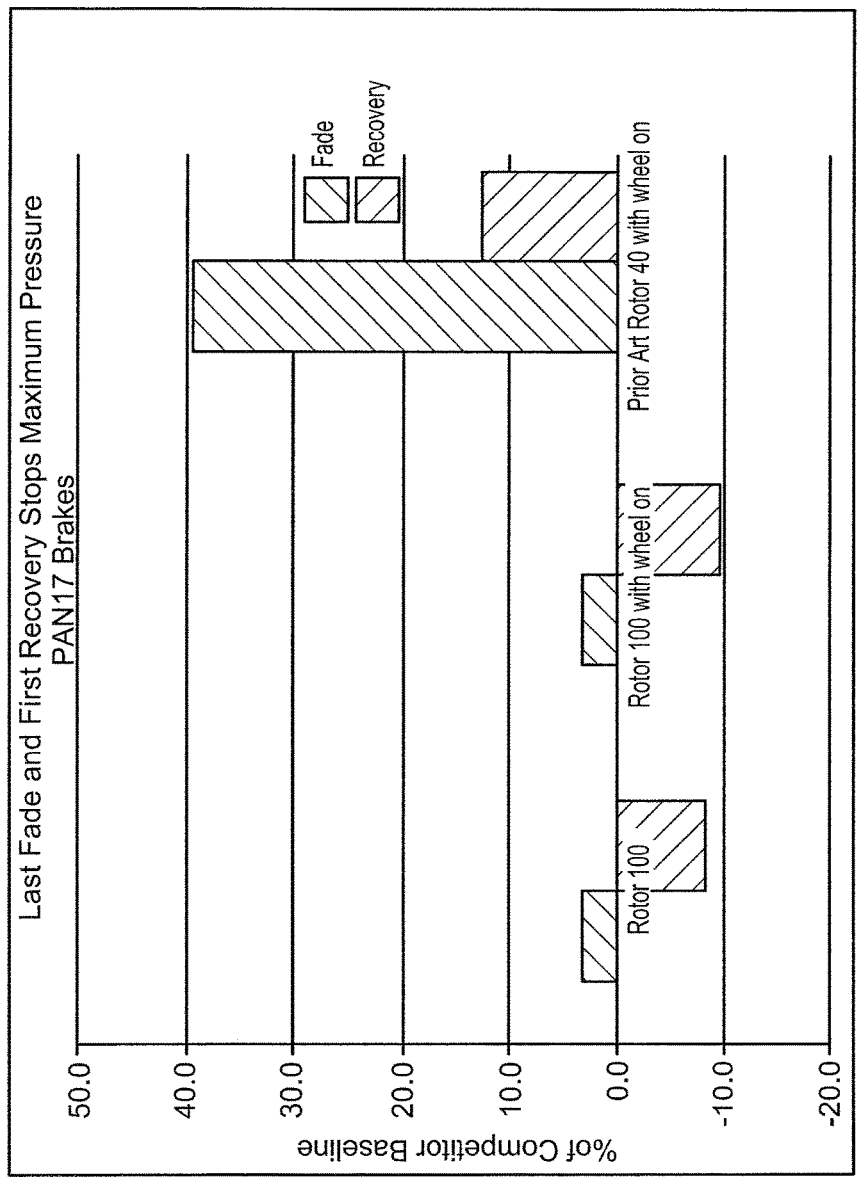
FIG. 10 is a plot of the fade and recovery pressure during the last and first stop in a respective test segment of an exemplary embodiment of the reduced-diameter brake rotor for heavy-duty vehicles of the present invention, and of an exemplary prior art reduced-diameter brake rotor for heavy-duty vehicles.

FIGS. 9 and 10 show the performance data and test results. FIG. 9 is a plot of the retardation ratio at 80 pounds per square inch (psi). Retardation ratio is the percentage (%)

of g-force produced by the brake at a temperature of 160 degrees Fahrenheit (° F.), which is referred to as a cold temperature. While the FMVSS-121 has a minimum requirement, it is desirable to see some margin over the minimum requirement. As seen in the plot, without a wheel on, rotor 100 of the invention had a higher retardation ratio than prior art rotor 40, and thus desirably performed better than the prior art rotor. With a wheel mounted, rotor 100 of the invention again had a higher retardation ratio than prior art rotor 40, and thus desirably performed better than the prior art rotor. It was observed that, with a wheel mounted on prior art ventilated rotor 40, the retardation ratio was undesirably much lower than the FMVSS-121 minimum requirement.

FIG. 10 is a plot of the fade and recovery pressure during the last and first stop in a respective test segment. The fade and recovery portion of the test is an energy absorption test. The requirement is to have less than 100 psi in the fade section and 85 psi in the recovery section of the test, so that less pressure is better. As seen in FIG. 10, with and without a tire/wheel, the fade pressures in the last stop for rotor 100 of the invention were at par with prior-art ventilated rotor 40 without a wheel mounted on each respective rotor. The test results indicate that rotor 100 of the invention had much better margins in the recovery section compared to prior art ventilated rotor 40. Also, the wheel mounting appeared to have no effect on brake performance for solid-disc rotor 100 of the invention with the Pan17 brake system, while in case of prior art ventilated rotor disc 40, the fade and recovery pressures were undesirably significantly higher than the baseline.

In this manner, the structure of reduced-diameter brake rotor 100 of a disc brake for heavy-duty vehicles of the present invention provides a construction that reduces the peak temperature of the rotor. More particularly, rotor 100 includes a solid disc 112 that adds mass to the working area of the disc, and may also include an increased thickness of the disc. Adding such mass reduces peak rotor temperatures, which in turn extends the life of the rotor and reduces thermal cracking of rotor disc inboard surface 116 and outboard surface 118, respectively. In addition, the increased mass of disc 112 desirably decreases heat transfer at bearings 16, 18 and main seal 32 of wheel end assembly 12, thereby increasing the performance and life of these components.

Rotor 100 also provides a large interface to wheel hub 22, which further increases the mass of the rotor, which increases the stability of the connection of the rotor to the hub. In addition, the increase of mass of rotor 100 at the interface with wheel hub 22 desirably reduces the heat transfer from the rotor, which in turn reduces peak temperature spikes experienced by wheel end main end seal 32 and lubricant, thereby desirably extending the life of the seal, lubricant, and bearings 16, 18.

In addition, rotor 100 is formed with undercut 128 and optional relief area 134, which enable the radial expansion of disc 112 to balance out with the tapered expansion of sleeve 114, thereby reducing or eliminating coning. Such a reduction or an elimination of coning promotes uniform contact between inboard surface 116 and its adjacent brake pad, and outboard surface 118 and its adjacent brake pad, thereby optimizing the efficiency of the brake system and increasing the life of the brake pads. Such a reduction or an elimination of coning also desirably reduces the stress at each point of contact between the brake pads and each respective inboard surface 116 and outboard surface 118 of disc 112 when compared to prior art rotor 40, which may in turn decrease the tendency of cracks to form in the disc, thereby increasing the life of rotor 100.

Moreover, rotor 100 includes a metallurgical composition which desirably maintains the heat transfer properties of the rotor, while decreasing the brittleness and improving the hot strength of the rotor. Rotor 100 also integrates tone ring 140 into inboard surface 116 of disc 112 to enable placement of the ABS sensor in a protected location and reduce issues that may be experienced by the tone ring. The use of integrated tone ring 140 and angled ABS sensor opening 146 enable the use of continuous weld 148, which in turn improves the fatigue strength of the connection of torque plate 142 to axle 10 when compared to the prior art use of an interrupted weld. Testing of rotor 100 and prior art rotor 40 indicates that the rotor of the invention provides increased FMVSS-121 compliance margins over the prior art ventilated rotor.

The present invention also includes a method of making and a method of using a reduced-diameter brake rotor 100 for heavy-duty vehicles of the present invention. The method includes steps in accordance with the description that is presented above and shown in FIGS. 2-10.

It is to be understood that the structure and arrangement of the above-described reduced-diameter brake rotor 100 for heavy-duty vehicles of the present invention may be altered or rearranged without affecting the overall concept or operation of the invention. In addition, the reduced-diameter brake rotor 100 for heavy-duty vehicles of the present invention may be employed with other types of axles, wheel end assemblies, axle/suspension systems, and/or brake systems than those shown and described above, without affecting the overall concept or operation of the invention. Moreover, while reference herein has been made generally to a heavy-duty vehicle for the purpose of convenience, it has been with the understanding that such reference includes trucks, tractor-trailers and semi-trailers, and trailers thereof.

Accordingly, the reduced-diameter brake rotor for heavy-duty vehicles of the present invention is simplified, provides an effective, safe, inexpensive, and efficient structure which achieves all the enumerated objectives, provides for eliminating difficulties encountered with prior art reduced-diameter disc brake rotors, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the reduced-diameter brake rotor for heavy-duty vehicles of the present invention is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A reduced-diameter brake rotor for heavy-duty vehicles, said rotor comprising:

a radially-extending disc, said disc including an inboard surface and an outboard surface, and a solid, constant cross-section between said inboard surface and said outboard surface, said disc including an outer diameter of from 320 mm to 330 mm and said constant cross-section including a thickness of from 30 mm to 45 mm;

a radially-extending mounting flange for mounting said rotor to a wheel hub of said vehicle; and an axially-extending sleeve being integrally formed with and extending between said disc and said mounting flange, said rotor yielding a value of up to about 280 when a test requirement of one-half of 20,000 lbs gross axle weight rating is divided by a weight of said disc.

2. The reduced-diameter brake rotor for heavy-duty vehicles of claim 1, further comprising an angled bell portion providing a transition from said sleeve to said mounting flange.

3. The reduced-diameter brake rotor for heavy-duty vehicles of claim 1, wherein said disc includes a thickness of about 34 mm.

4. The reduced-diameter brake rotor for heavy-duty vehicles of claim 1, wherein an overall weight of said rotor divided by an outer diameter of said disc yields a value of about 4.2 lbs/in.

5. The reduced-diameter brake rotor for heavy-duty vehicles of claim 1, wherein a diameter of a bolt circle of said mounting flange divided by an outer diameter of said disc yields a value of about 0.77.

6. The reduced-diameter brake rotor for heavy-duty vehicles of claim 1, wherein said mounting flange includes radially-extending projections, each one of which is formed with an opening, and said projections and openings are separate from wheel studs of a wheel end assembly of said vehicle.

7. The reduced-diameter brake rotor for heavy-duty vehicles of claim 1, wherein said outboard surface of said disc is formed with an undercut.

8. The reduced-diameter brake rotor for heavy-duty vehicles of claim 7, wherein said undercut is formed at a location where said outboard surface of said disc meets said sleeve.

9. The reduced-diameter brake rotor for heavy-duty vehicles of claim 8, wherein said undercut includes a minimum depth of about 8 mm.

10. The reduced-diameter brake rotor for heavy-duty vehicles of claim 8, wherein said inboard surface of said disc is formed with a relief area opposite from said undercut.

11. The reduced-diameter brake rotor for heavy-duty vehicles of claim 10, wherein said relief area is of a depth that is shallower than a depth of said undercut.

12. The reduced-diameter brake rotor for heavy-duty vehicles of claim 1, wherein said disc includes a carbon content of from about 2.80 weight percent to about 3.20 weight percent carbon and a silicon content of from about 1.80 weight percent to about 1.95 weight percent silicon.

13. The reduced-diameter brake rotor for heavy-duty vehicles of claim 12, wherein said disc includes a vanadium content of from about 0.05 weight percent to about 0.15 weight percent vanadium.

14. The reduced-diameter brake rotor for heavy-duty vehicles of claim 1, further comprising:

a tone ring integrally formed in said disc inboard surface, said tone ring being in operative communication with an ABS sensor mounted in an opening formed in a torque plate, said opening providing an angled orientation of said ABS sensor of about 15 degrees, and targeting a 150 mm pitch circle, said torque plate being circumferentially attached to an axle with a continuous weld.

15. A reduced-diameter brake rotor for heavy-duty vehicles, said rotor comprising:

a radially-extending disc, said disc including an inboard surface and an outboard surface, and a solid, constant cross-section between said inboard surface and said outboard surface, said disc including an outer diameter of from 320 mm to 330 mm and said constant cross-section including a thickness of from 30 mm to 45 mm;

a radially-extending mounting flange for mounting said rotor to a wheel hub of said vehicle; and an axially-extending sleeve being integrally formed with and extending between said disc and said mounting flange, said rotor yielding a value of up to about 190 when a test requirement of one-half of 20,000 lbs gross axle weight rating is divided by an overall weight of said rotor.

* * * * *